United States Patent
Bergman

(10) Patent No.: US 6,507,435 B1
(45) Date of Patent: Jan. 14, 2003

(54) VARIABLE SIZE PROJECTION SCREEN APPARATUS WITH A PROJECTION SCREEN THAT IS PHYSICALLY RESIZABLE IN A LATERAL DIRECTION ON AT LEAST TWO DISTINCT LEVELS, AND A SCREEN ARRANGEMENT FOR USE IN SUCH APPARATUS

(75) Inventor: Anthonie H. Bergman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/294,864

(22) Filed: Apr. 20, 1999

(30) Foreign Application Priority Data

Apr. 29, 1998 (EP) .............................................. 98201387

(51) Int. Cl.⁷ .............................................. G03B 21/56
(52) U.S. Cl. ...................................... 359/443; 359/449
(58) Field of Search ............................... 359/443, 446, 359/449, 461, 450; 353/79

(56) References Cited

U.S. PATENT DOCUMENTS

| | | | | |
|---|---|---|---|---|
| 4,106,852 A | * | 8/1978 | Chasins | 359/443 |
| 4,795,946 A | | 1/1989 | Nishiyama | 315/370 |
| 4,951,149 A | * | 8/1990 | Faroudja | 358/230 |
| 5,343,257 A | * | 8/1994 | Kohno et al. | 348/842 |
| 5,461,431 A | | 10/1995 | Takebuchi et al. | 348/806 |
| 5,519,447 A | | 5/1996 | Shima et al. | 348/556 |
| 5,737,123 A | * | 4/1998 | Donohoe | 359/450 |
| 5,777,697 A | | 7/1998 | Baek | 348/806 |
| 5,860,721 A | | 1/1999 | Bowron et al. | 353/101 |

FOREIGN PATENT DOCUMENTS

JP 6-237429 * 8/1994

* cited by examiner

Primary Examiner—Christopher Mahoney

(57) ABSTRACT

A variable size projection screen apparatus inputs an image and generates a beam to project the image on a screen. A sizing facility can resize the image on the screen in at least two different sizes. A motor arrangement can physically resize the screen in a lateral direction to at least two distinct widths.

13 Claims, 2 Drawing Sheets

VARIABLE SIZE PROJECTION SCREEN APPARATUS WITH A PROJECTION SCREEN THAT IS PHYSICALLY RESIZABLE IN A LATERAL DIRECTION ON AT LEAST TWO DISTINCT LEVELS, AND A SCREEN ARRANGEMENT FOR USE IN SUCH APPARATUS

BACKGROUND AND SUMMARY OF THE INVENTION

Kokai (JP 6-237429) discloses a screen organization for allowing display of TV images both at a classic aspect ratio of 3:4 and also at a wider aspect ratio of 9:16, by shuttering lateral strips of the screen so that the narrower screen will be filled completely by the 3:4 image. This procedure will keep the image height, as well as the overall size of the screen arrangement, constant.

The inventor has recognized a need to allow using a single projection screen arrangement for generating images at different sizes, and to assign resizing facilities to a projection screen device to form images in distinctly different sizes, while resizing the physical screen dimensions in accordance with the actual image.

According to the invention, the screen proper is physically resizable in a lateral direction on at least two distinct levels. It has been found that such physical resizing is more flexible and less distracting, and more pleasing to a viewer than the prior art arrangement.

Advantageously, the apparatus is arranged for physically resizing the screen in two directions to images that have substantially uniform height-to-width ratios and substantial differences among corresponding dimensions. Now, prior art exclusively has diminished the effective screen width by only −25% with respect to the wider image. The present invention allows a much wider variation in physical screen size, that may depend on such circumstances as the size of the audience, the nature of an actual program, and the viewer's seating distance from the screen and/or other viewer activities. The invention may then use various different combinations, such as the standard aspect ratio at a smaller size, while allowing Wide Screen TV aspect ratio at a larger size. In this way, the invention allows screen area variations by factors such as 2, 4, or even more. The invention is by and large much more flexible than the prior art. On the other hand, especially for use with present-day high quality image rendering, using such quasi-screen matter as a white wall, a reversed picture or the like as a basis for projection on such wall has proved to be insufficient.

The invention also relates to screen device for use with such apparatus.

DETAILED DESCRIPTION OF PREFERRED EMBODIMENTS

The embodiments infra will be detailed for front projection, but rear projection or even the use of both in a single hardware arrangement may in principle benefit from similar advantages, depending on the providing of a suitable screen material for implementing the physical size variations disclosed hereinafter. The selecting of appropriate screen materials would be clear to a person skilled in the art. As regarding the occasions for use, audience size may vary from a single person viewing a news program to a kindergarten party looking at a show like The Muppets. The nature of the program may range from the rendering of Teletext and similar images, to a wide-screen Discovery film, or even the generating of a decorating (still) image. Also, the viewer's seating distance may vary from a stationary writing-desk setting to a situation where the viewer is distant and moving around like during ironing or vacuum cleaning.

Figure 1A:
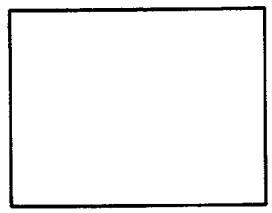
FIGS. 1A–1C, user appearance of an inventive apparatus.
Figure 1B:
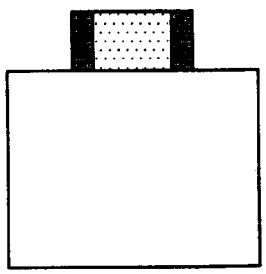
Figure 1C:
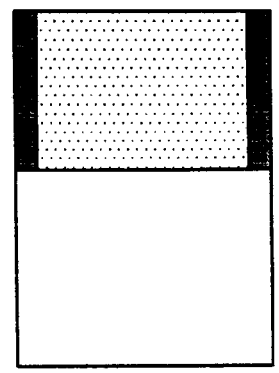

Now, FIGS. 1A–1C show various user appearances of the inventive apparatus. As shown, a cabinet or other shape may be used to substantially fully hide the screen when not in use. Here, the height of the cabinet is equal to the maximum height of the screen, and similarly for the width of the cabinet. The depth of the cabinet need not be larger than necessary for hiding the screen mechanism, if such is wished at all. Generally, a few centimetres will suffice but the cabinet may serve further useful purposes. In FIG. 1A, the screen is fully hidden behind the outer appearance. In FIG. 1B, a relatively small screen such as 45×60 centimetres is used in situations where a living-room size is preferred. The rest of the screen structure remains hidden. In FIG. 1C, a relatively large screen such as 90×120 centimetres, serves for situations such as lecturing or a group amusement situation.

Figure 2A:
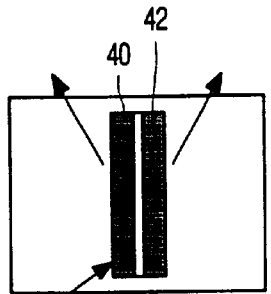
FIGS. 2A–2C, screen arrangements of such apparatus.
Figure 2B:
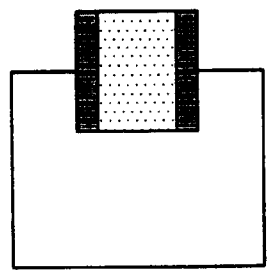
Figure 2C:
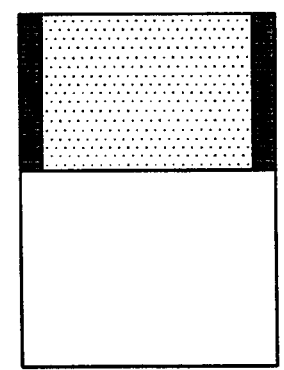

FIGS. 2A–2C show screen arrangements of the apparatus, in respective correspondence with FIGS. 1A–1C. In FIG. 2A, the screen is fully hidden and substantially completely scrolled-in by sideway scrolls 40, 42, so that only the vertical size corresponds to that of the maximum screen. Without restriction, the diameters of the scrolls may be as little as five centimetres. In FIG. 2B, the screen is hidden only halfway and halfway unrolled. In FIG. 2C, screen is fully exposed and also, fully unrolled.

Figure 3:
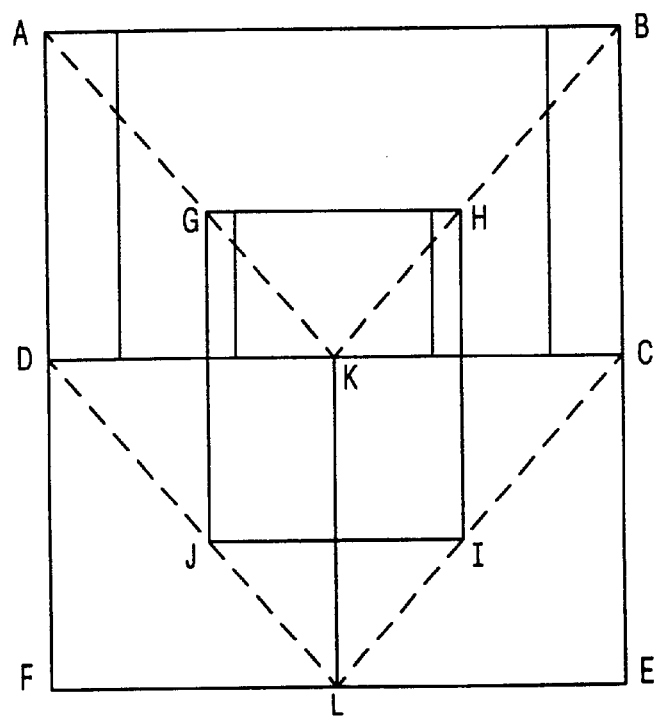
FIG. 3, control mechanics of such apparatus.

FIG. 3 shows exemplary control mechanics of the apparatus. Rectangle CDFE is the hiding shape. Rectangle ABCD is the full-size screen, at High Definition TV aspect ratio. Rectangle GHIJ is the screen when halfway unrolled at the same aspect ratio. The widths of the scrolls proper have been ignored. The line KL is the central axis of the screen when rolled in. Hatched lines KGA, KHB, LJD, and LIC indicate the apparent paths of the screen structure corners during roll-out. Dotted lines indicate screen narrowing to classical TV aspect ratio of 3:4. The screen sizes may be limited to the three cases as shown, but it may be feasible to use various intermediate values as well. If only two formats are used, the hiding structure may be narrowed to correspond to that of rectangle GHIJ. Further scrolling-in may then be foregone. Screen mechanics may be more or less continuous through two motor arrangements, cone for vertical and one for unscrolling. Alternatively, screen corners may be moved by parallelogram structures if only a few positions need be realized. Combinations of these features may be feasible as well.

Figure 4A:
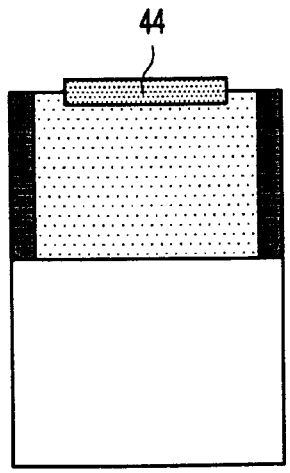
FIGS. 4A–4C, shape fixating elements of the apparatus.
Figure 4B:
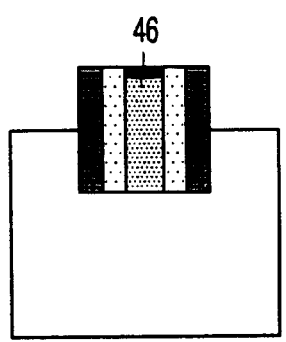
Figure 4C:
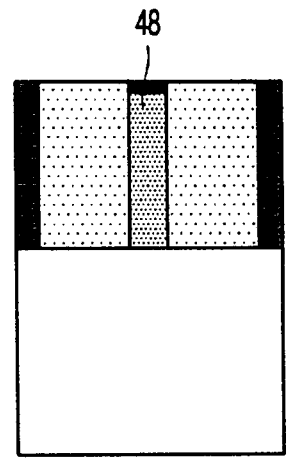

FIGS. 4A–4C show shape fixating elements of the apparatus. In FIG. 4A, a top bar will keep the upper edge of the screen straight; various mechanisms may be used to let the scrolling avoid problems due to the lack of flexibility in the bar. In FIG. 4B, central vertical bar 46 will diminish screen camber by effectively halving screen width. In FIG. 4C, bar 48 is shown raised together with the screen.

Figure 5:
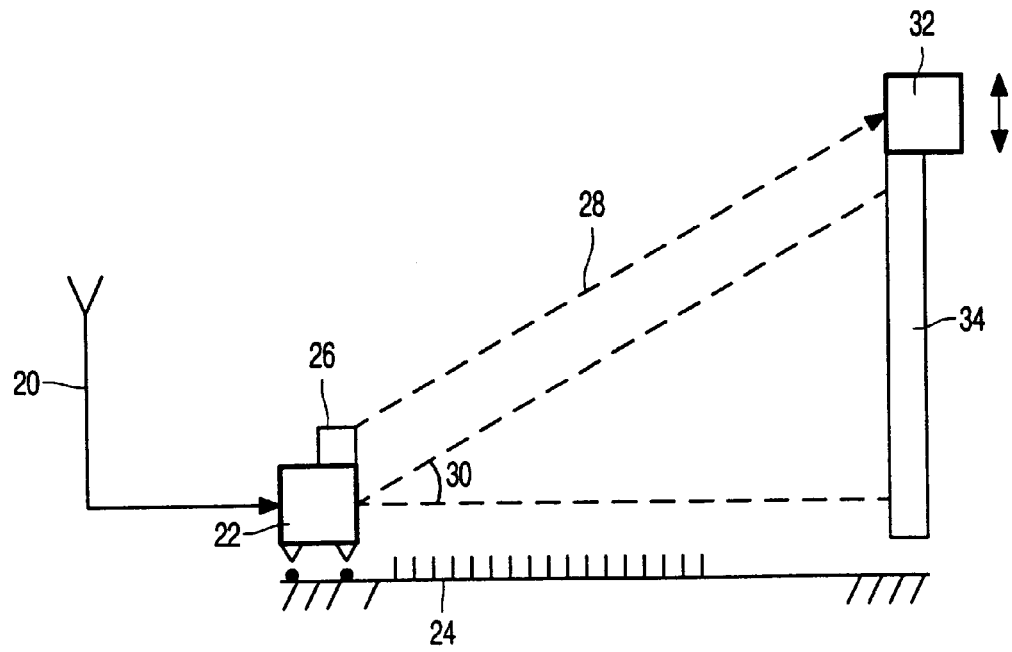
FIG. 5, an exemplary mechanical setup of the apparatus.

FIG. 5 shows an exemplary mechanical setup of the apparatus for use with projection television. The image signal is fed on antenna 20. Block 22 symbolizes all image processing and control functionality, inclusive of size control. As shown, image angle 30 is fixed. Often, lower beam edge will be horizontal. For ceiling mount, upper beam edge will be horizontal. The setup necessitates the moving of processing block 22 along floor 24. The moving will then immediately determine effective image size. Alternatively, zooming across different angle values with corresponding resizing of the image is feasible. Once the necessary screen size is known, through taking into account the image distance and angle, the size of screen 34 must be controlled in line with the foregoing. This is mechanically and automatically effected by mechanism 32, that may get necessary control signals from central control 22, such as by wireless transmitter 26 along link 28. In addition to the above, image angle may need additional vertical variation to cope with the apparent vertical screen position when amending the screen size.

A different automatism can operate through an in-screen sensor that picks up a predetermined projected image. For operation, the screen arrangement sends a control signal that will drive the projector into "determine screen size mode". Next, a sensor on the active screen will on the basis of appropriate details of the image such as content, check whether the screen has indeed the correct size. Such content may be a special marker that is projected at a corner of the image on a dedicated sensor. Alternative manners for wireless transmission of control signals are widely known in the field of consumer audio/video.

What is claimed is:

1. A variable size projection screen apparatus comprising:
   image projection means including image feed means for inputting an image and beam generation means for generating a beam;
   screen means arranged for imaging said beam on a screen; and
   a sizing facility for resizing an image on said screen in at least two distinctly different sizes,
   the image projection means further including a motor arrangement for physically resizing said screen in a lateral direction to at least two distinct widths.

2. An apparatus as claimed in claim 1, being arranged for physically resizing the screen in two directions to images that have substantially uniform height-to-width ratios and substantial differences among corresponding dimensions.

3. An apparatus as claimed in claim 1, for use with front and/or rear projection.

4. An apparatus as claimed in claim 1, wherein said physically resizing is based on horizontal screen scrolling.

5. An apparatus as claimed in claim 1, wherein said physically resizing is automatic.

6. A screen device for use with a variable size projection screen apparatus for imaging a beam generated by projection means that have image feed means and beam generation means, whilst having a sizing facility for resizing an image on said screen in at least two distinctly different sizes, comprising:
   a screen; and
   a motor arrangement for physically resizing the screen in a lateral direction to at least two distinct widths.

7. An screen device as claimed in claim 6, arranged for being physically resized in two directions to images that have substantially uniform height-to-width ratios and substantial differences among corresponding dimensions.

8. A screen device as claimed in claim 6, for use with front and/or rear projection.

9. A screen device as claimed in claim 6, wherein said physically resizing is based on horizontal screen scrolling.

10. A device as claimed in claim 9, having scroll facilities that are substantially laterally symmetric with respect to any actual image.

11. A screen device as claimed in claim 6, wherein said physically resizing is automatic.

12. A device as claimed in claim 6, wherein area ratio between said sizes is at least equal to 2.

13. A device as claimed in claim 6, having hide means for on at least one level hiding a part of the screen that is not being used for displaying an image.

* * * * *